(12) United States Patent
Fuller et al.

(10) Patent No.: US 7,746,726 B2
(45) Date of Patent: *Jun. 29, 2010

(54) METHOD FOR PROCESSING BOREHOLE SEISMIC DATA

(76) Inventors: Brian Nelson Fuller, 8457 E. Hinsdale Dr., Centennial, CO (US) 80112; John Marcus Sterling, 8122 Southpark La., Suite 207, Littleton, CO (US) 80120

(*) Notice: Subject to any disclaimer, the term of this patent is extended or adjusted under 35 U.S.C. 154(b) by 0 days.

This patent is subject to a terminal disclaimer.

(21) Appl. No.: 12/103,493

(22) Filed: Apr. 15, 2008

(65) Prior Publication Data
US 2008/0192572 A1 Aug. 14, 2008

Related U.S. Application Data

(63) Continuation of application No. 11/049,234, filed on Feb. 2, 2005, now Pat. No. 7,359,284.

(60) Provisional application No. 60/542,568, filed on Feb. 6, 2004.

(51) Int. Cl.
*G01V 1/32* (2006.01)
*G01V 1/36* (2006.01)

(52) U.S. Cl. .............................. 367/57; 367/50; 367/73

(58) Field of Classification Search .................... 367/37, 367/40, 50–53, 57, 73
See application file for complete search history.

(56) References Cited

U.S. PATENT DOCUMENTS

| 4,627,036 | A | * | 12/1986 | Wyatt | 367/57 |
|---|---|---|---|---|---|
| 4,802,147 | A | * | 1/1989 | Moeckel | 367/57 |
| 4,894,809 | A | * | 1/1990 | Moeckel | 367/57 |
| 5,394,325 | A | * | 2/1995 | Schneider, Jr. | 702/18 |
| 5,596,548 | A | * | 1/1997 | Krebs | 367/56 |
| 5,995,446 | A | * | 11/1999 | Meyer et al. | 367/25 |
| 6,002,642 | A | * | 12/1999 | Krebs | 367/73 |
| 6,035,256 | A | * | 3/2000 | Stankovic | 702/14 |
| 6,501,703 | B2 | * | 12/2002 | Zhou et al. | 367/38 |
| 6,748,330 | B2 | * | 6/2004 | Leaney | 702/14 |
| 2003/0130796 | A1 | * | 7/2003 | Wiggins | 702/14 |

* cited by examiner

*Primary Examiner*—Scott A Hughes

(57) ABSTRACT

Seismic data recorded by subsurface seismic sensors placed in a borehole, such as an oil or gas well, are transformed via a process of upward wavefield propagation to pseudo-receivers at the surface of the earth. The seismic data thus transformed can be processed as though the data had been recorded by the pseudo-receivers at the surface rather than in the borehole where the data were actually recorded. This method accurately accounts for seismic source statics, anisotropy, and all velocity effects between the real receivers in the borehole and the pseudo-receivers at the surface of the earth.

19 Claims, 19 Drawing Sheets

METHOD FOR PROCESSING BOREHOLE SEISMIC DATA

CROSS-REFERENCE TO RELATED APPLICATION

This application is a continuation of U.S. Utility application Ser. No. 11/049,234 filed Feb. 2, 2005, now U.S. Pat. No. 7,359,284, which application claims the benefit of U.S. Provisional Application No. 60/542,568 filed 6 Feb. 2004.

BACKGROUND OF THE INVENTION

1. Field of the Invention

The present invention relates generally to the field of processing of borehole seismic data. More specifically, the present invention discloses a method for processing borehole seismic data into the form of surface seismic data so that conventional surface seismic data processing methods can then be applied to form a subsurface image of the earth.

2. Statement of the Problem

The widely known and widely used art of surface seismology involves placing seismic sources and seismic receivers at the surface of the earth and recording seismic waves that originate at the seismic source point. As illustrated in FIG. 1, a conventional method of collecting seismic data in surface seismic operations is to place seismic sources and seismic receivers at the surface of the earth. Each seismic source is initiated and the seismic wavefield from the individual seismic sources is recorded on multiple receivers. Data recorded by geophones (also known as seismometers) at the surface of the earth can be processed by widely known methods (see, Yilmaz, O., *Seismic Data Processing*, (Society of Exploration Geophysicists, 1987)) to obtain an image of the interior of the earth.

One of the most commonly used processing methods is called CDP (Common Depth Point) processing. In this method, sources and receivers from different common source gathers (see FIG. 1) are sorted into common midpoint gathers, otherwise known as CDP (Common Depth Point) gathers, as illustrated in FIG. 2.

Reflections in a CDP gather are hyperbolic in the time-offset plane, as shown in FIG. 3, where the word "offset" is used to describe the horizontal distance from the source to the receivers. The trace on the left side of the gather in FIG. 3 has an offset of zero, in other words the source and receiver were coincident in space at the time of recording. The time delay of reflections with increasing offset is due to the increased seismic wave travel path with increased source-receiver separation in the horizontal direction.

A mathematical operation known as Normal Moveout (NMO) can be applied to the reflections in a CDP gather to correct reflection travel times so that the reflection time after application of NMO is equivalent to the travel time at zero-offset, i.e., where the source and receiver were coincident at the surface of the earth at the time of recording. FIG. 4 shows a synthetic common depth point gather in FIG. 3 after correction for NMO.

Having both sources and receivers at the surface of the earth is required for two key aspects of this reflection seismology technique to work properly. The two aspects are: (1) to first order, the spatial point from which a seismic reflection originates can be assumed to be half way between the source and receiver; and (2) the shape of a reflection in the time-offset plane is hyperbolic and can be predicted by the NMO equation. The assumptions of these two key aspects are violated in proportion to the degree that reflecting interfaces in the subsurface dip (or tilt) from flat lying. But even with steep dips, the earth can be imaged with well-developed surface seismic techniques.

A sub-field of reflection seismology is borehole seismology in which seismic receivers are placed in one or more boreholes in the subsurface and source points are at the surface of the earth, as shown in FIG. 5. This type of data is generally known as Offset VSP (Vertical Seismic Profile) data, but is also alternatively known as 2D VSP or 3D VSP data. Alternatively the source can be in the borehole with receivers at the surface of the earth. The borehole seismic source can be of any type, including data derived from using a drilling bit as the seismic source. This technique is commonly known as Reverse VSP.

There are significant advantages to recording seismic data by VSP methods, not the least of which is increased seismic frequency content over that which can be recorded at the surface of the earth. Therefore, the potential exists to obtain greater geologic detail from the data. The significant disadvantage however is that the symmetry of having source and receivers at the same elevation is lost. Thus, the common midpoint reflection point assumption is lost and the NMO equation does not apply. Further, there is not currently an analogous equation for midpoint determination and moveout correction to apply to offset VSP data.

SOLUTION TO THE PROBLEM

The present invention provides a method that enables borehole seismic data (e.g., VSP data) to be transformed into a form such that the data is as though it had been recorded with seismometers at the surface of the earth. After this transformation, the data can be processed as though it had been originally recorded at the surface of the earth using well-developed methods of surface seismic data processing. The transformation is achieved by continuation of the wavefield in time to a number of pseudo-receivers located at the surface. Wavefield continuation can be achieved via multiple methods, two of which are described below as alternative methods that achieve the desired goal of this invention.

The prior art in the general field of wavefield propagation includes scientific literature containing fundamental ideas that naturally spring from the mathematics that describe elastic wave motion. For example, Huygens' principle provides that the position of a subsequent wavefront may be found by regarding each point of an earlier wavefront as a source of spherical secondary waves whose envelope constitutes the new wavefront. Elmore and Heald, *Physics of Waves*, page 323 (Dover Publications, 1969).

Specific techniques that make use of wavefield continuation in the field of seismic data analysis include upward continuation of surface seismic data from the surface of the earth to relatively near-by artificial planes for the purpose of relieving statics problems. U.S. Pat. No. 5,629,905 (Lau) discloses a method for downward continuation of surface seismic data to arbitrary subsurface planes for the purposes of improved imaging of complex surfaces. Specifically related to borehole seismic data, Ala'i, Riaz, *Improving Predrilling Views By Pseudo Seismic Borehole Data*, Ph.D. thesis, Delft University of Technology, The Netherlands. (1997), showed the concept of transforming surface seismic data into zero-offset VSP seismic data by downward continuation of the surface seismic wavefield.

None of these methods either implicitly or explicitly addresses the process of upward continuation of borehole seismic data for the purpose of transforming the data into a form suitable for use with surface seismic data processing techniques. Therefore, a need exists for a method of processing offset VSP data that is not limited by the asymmetry imposed by the original source-receiver recording geometry that includes the sources and receivers at very different elevations at the time of recording.

SUMMARY OF THE INVENTION

This invention provides a method for processing seismic reflections recorded with receivers in a borehole (such as an oil or gas well) with seismic sources at or near the surface of the earth in order to turn the reflection data into a seismic reflection image of the earth. Seismic data recorded with receivers in a borehole are transformed by any means of wavefield propagation to pseudo-receiver positions at the surface of the earth. For example, this wavefield propagation can be done by application of Huygens' principle. By this method, the observed travel times between source points at the surface of the earth and receivers in the borehole are used to transform the seismic data recorded in the borehole into data traces as they would have appeared if they had been recorded at the surface of the earth. Application of Huygens' principle in this way accounts for all velocity variations in the earth, near-surface statics, and anisotropic velocity effects in propagation of the wavefield from the borehole to the surface of the earth.

Once the seismic data have been transformed to the surface of the earth, the data can be processed as normal surface seismic data. Thus the data processor is able to make full use of the symmetry advantages conferred by having the seismic sources and receivers at or near the same elevation. One principle benefit of this method is that reflections are placed at their correct reflection position in the time domain by means of the standard methods of migration of surface seismic data. No standard time-domain migration method is commonly practiced that allows accurate placement of reflections when they are migrated directly from a borehole (deep subsurface) position.

Application of this invention to real Offset VSP seismic data results in high-quality reflection images of the earth in two-way time and in the correct horizontal spatial dimensions. These images can be directly used as time-domain images for interpretation.

Reciprocity principles allow this method to be applied to Reverse VSP data just as well as it is applied to normal offset VSP data. Source points in the borehole and receivers at the surface of the earth provide the same travel time information that is required to apply Huygens' principle in creating new pseudo-receivers at the surface.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
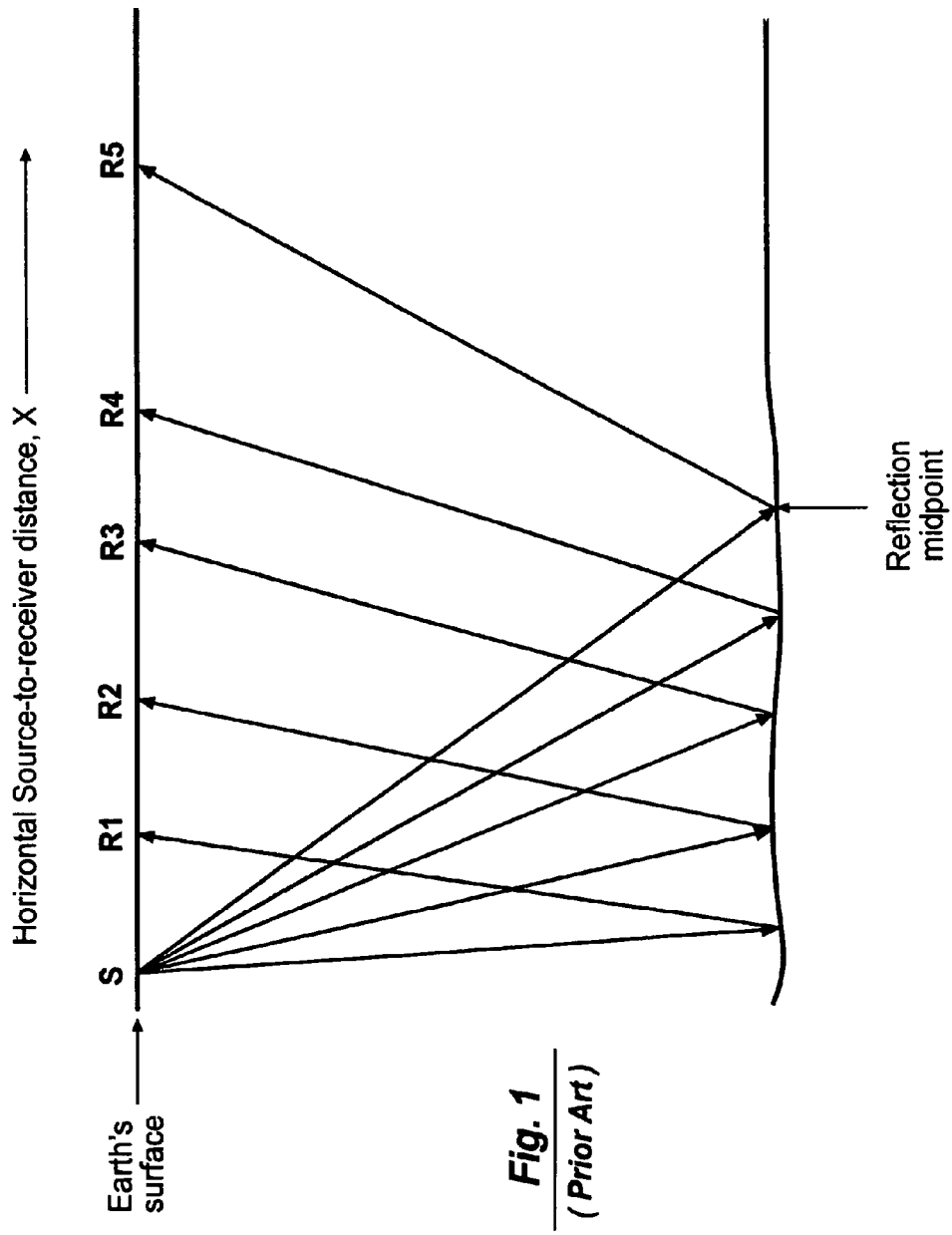
FIG. 1 is a cross-sectional diagram of a portion of the earth's surface showing a number of source-receiver pairs in a common source gather.
Figure 2:
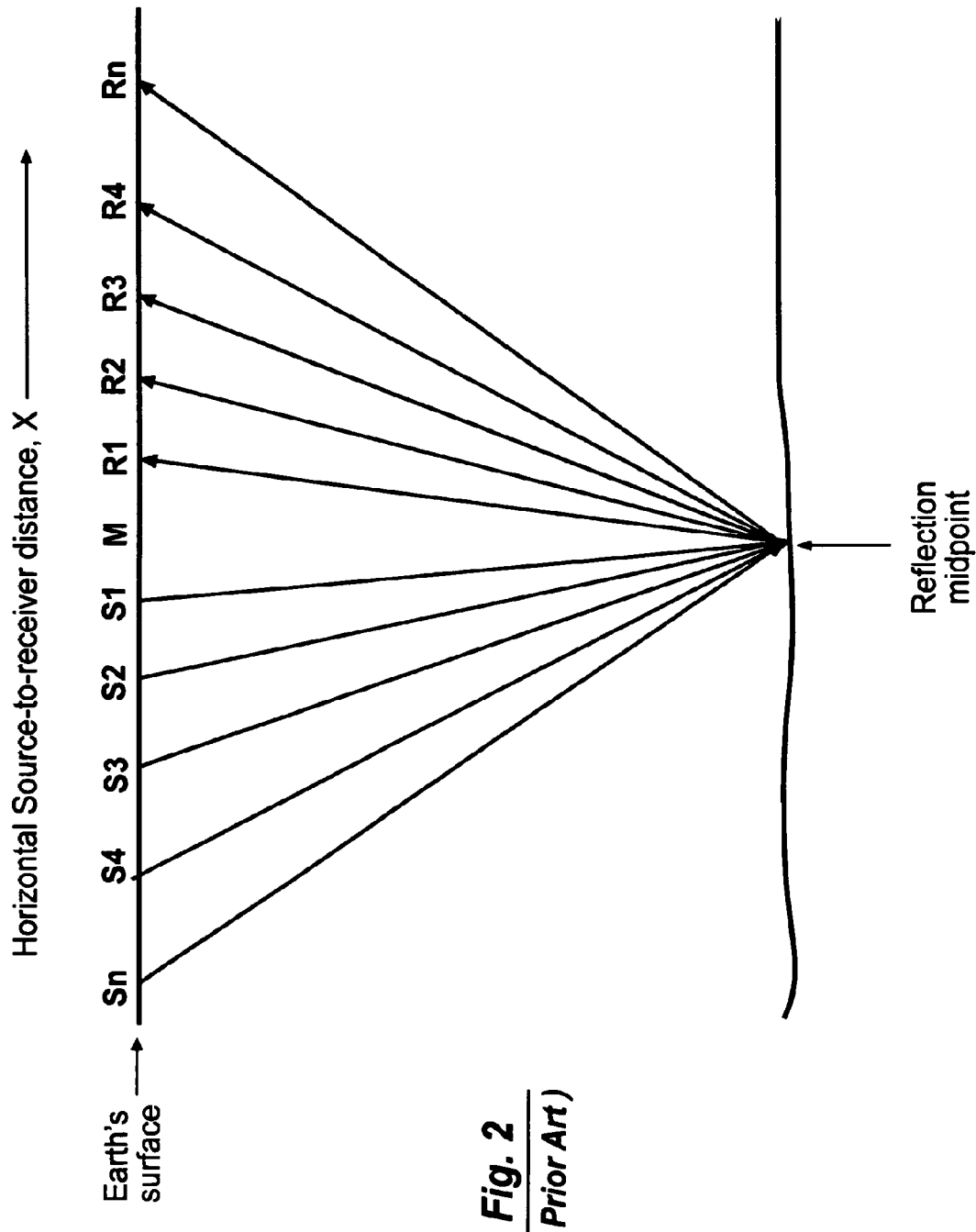
FIG. 2 is a cross-sectional diagram similar to FIG. 1 showing a number of source-receiver pairs in a common mid-point gather.
Figure 3:
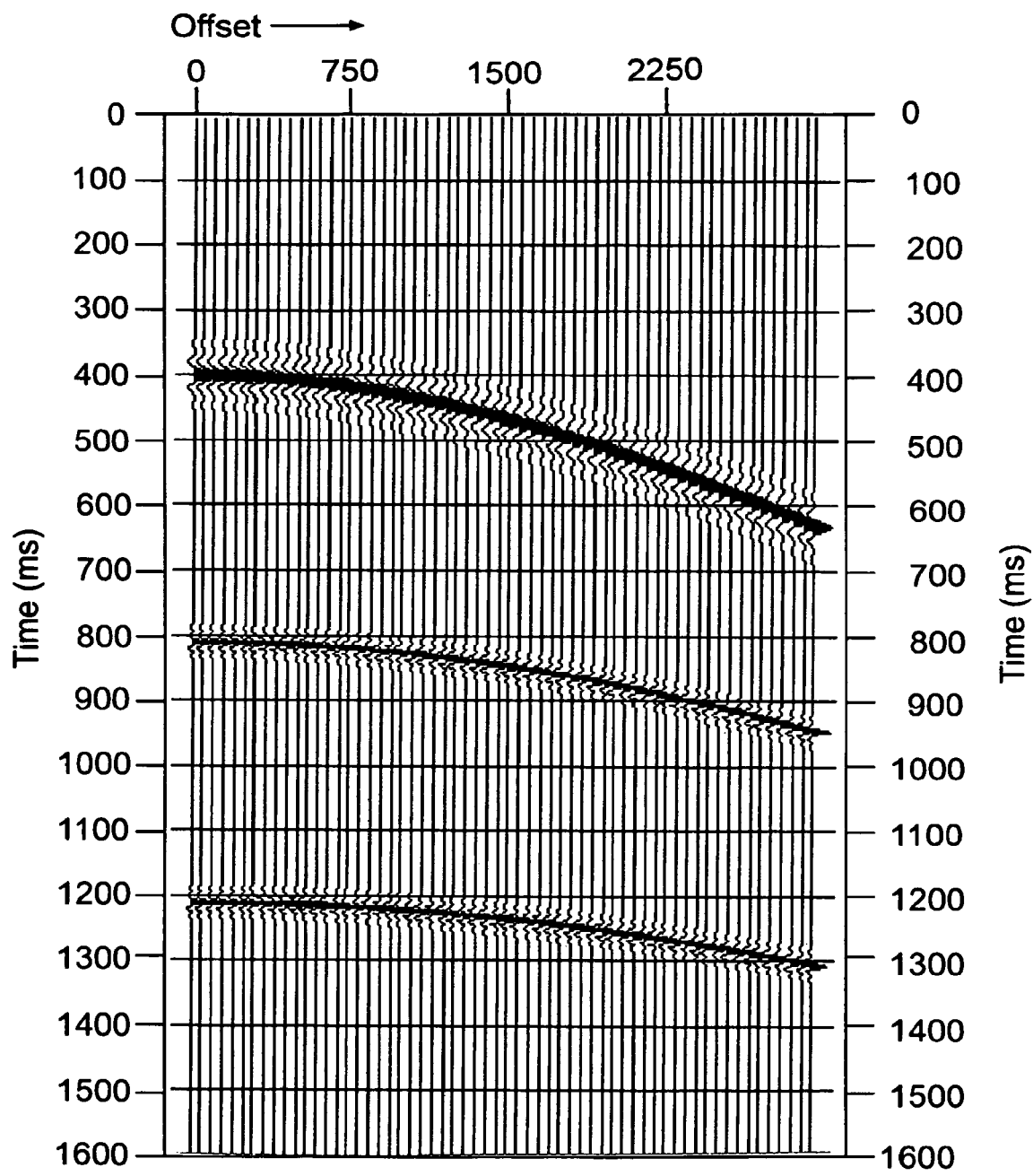
FIG. 3 is a graph showing a synthetic common seismic depth point (CDP) gather with reflections that have not been corrected for normal moveout (NMO).
Figure 4:
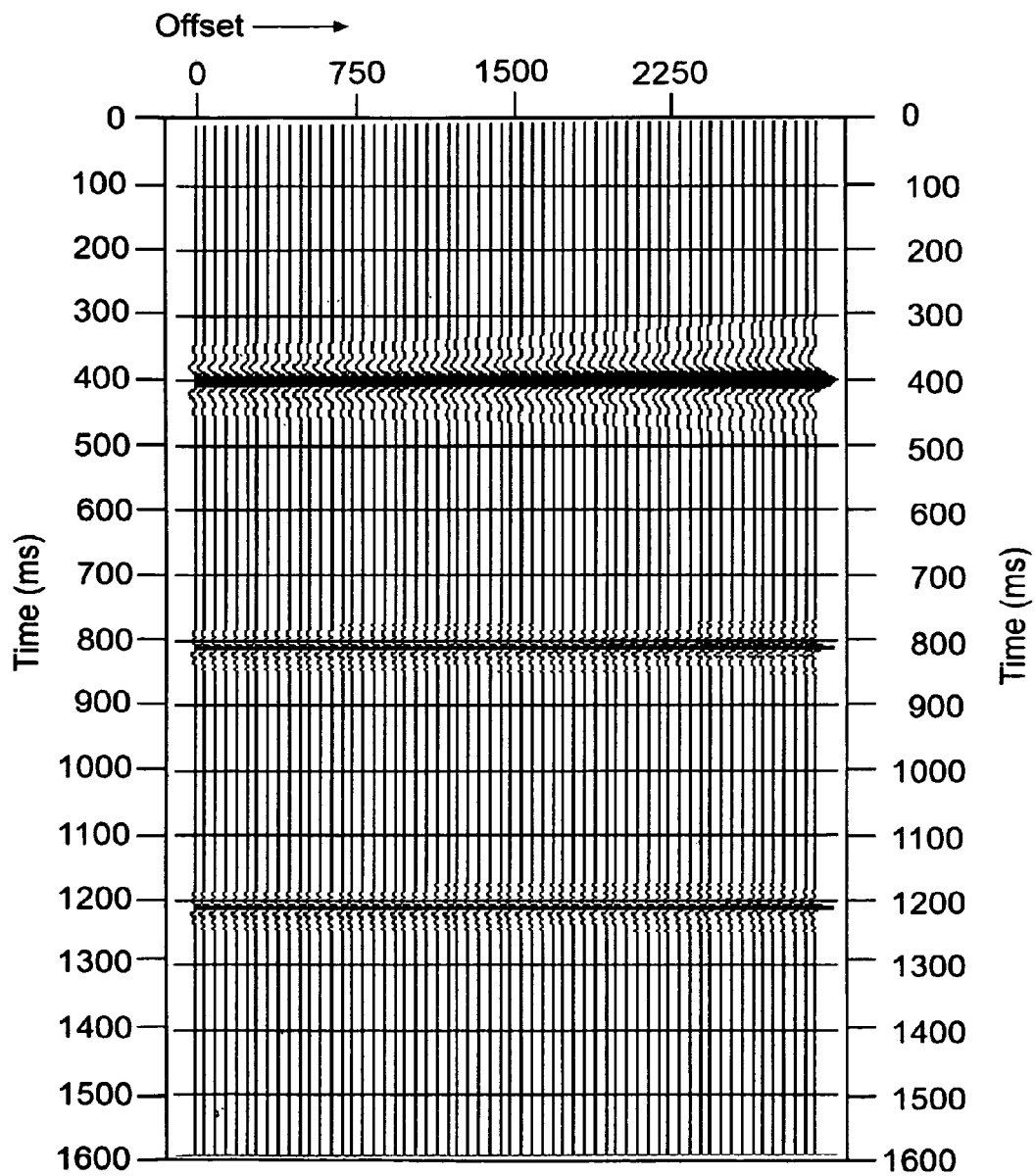
FIG. 4 is a graph showing the synthetic common depth point (CDP) gather in FIG. 3 after correction for NMO.
Figure 5:
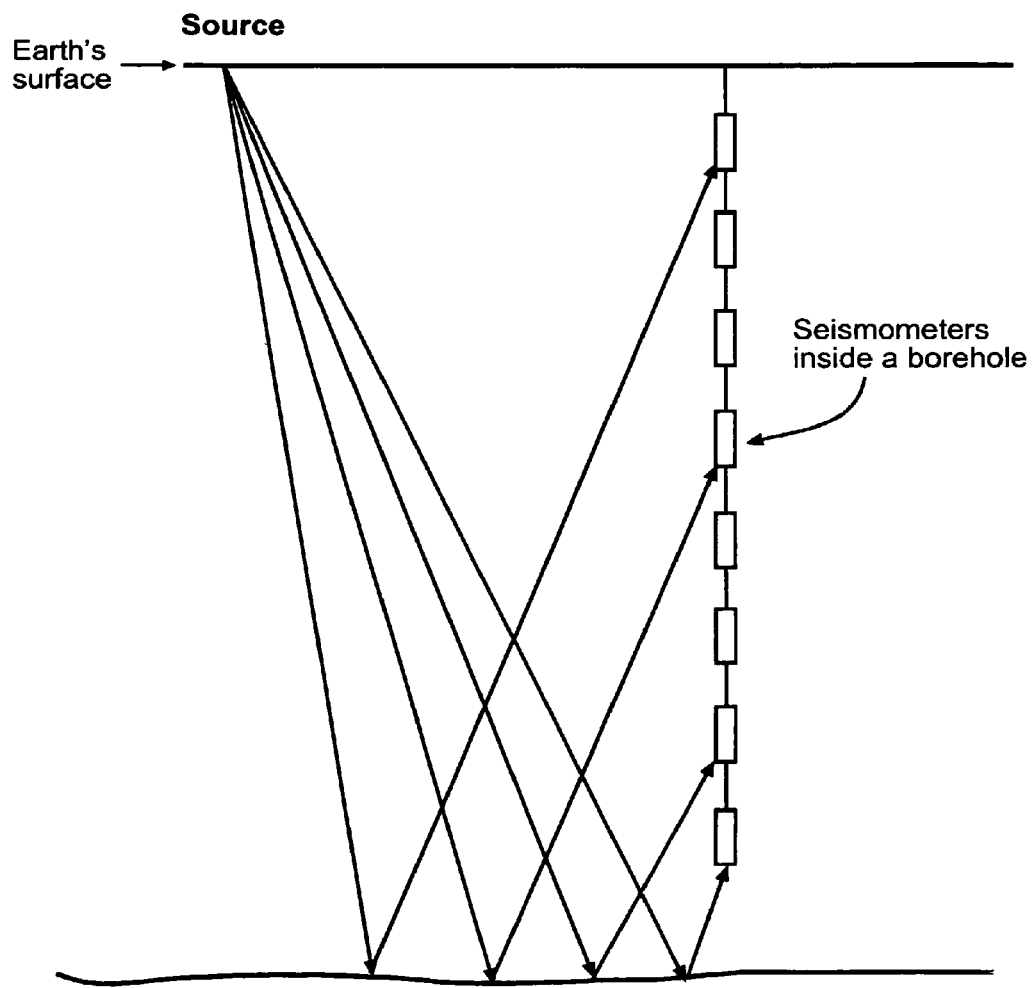
FIG. 5 is a cross-sectional diagram showing a number of source-receiver pairs in a common source gather recorded with seismometers in a borehole.

The present method begins with seismic data recorded as in FIG. 5 in which seismic receivers (seismometers, hydrophones, geophones, etc) are placed in a borehole such as an oil or gas well and seismic sources are initiated at or near the surface of the earth. Seismic waves propagate from the seismic source into the earth. Seismic energy propagates to the borehole receivers whereupon the seismic receivers generate a signal in response to the seismic energy. The seismometer signal is then typically transmitted to a recording instrument at the surface of the earth and recorded on an electronic medium such as magnetic tape, optical device, or hard disk.

Some of the propagating energy travels directly from the seismic source to the receivers and provides a measure of the travel time from the seismic source position to the receiver position. Other energy reflects from subsurface interfaces and is also recorded at the receivers in the borehole. Other energy propagates and is recorded as converted waves and refractions and other energy propagates away from the borehole and is not recorded.

Figure 6:
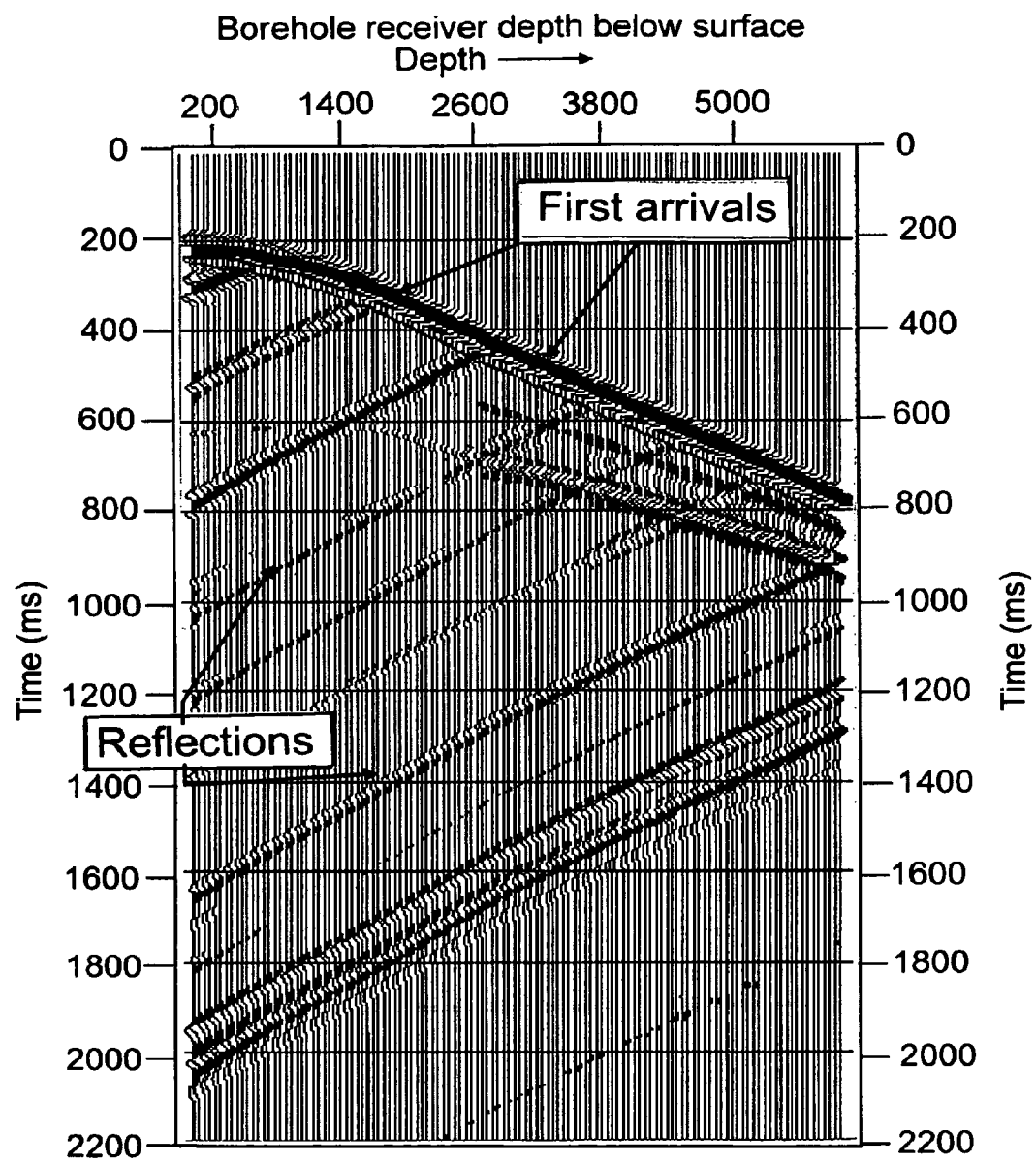
FIG. 6 is a graph showing a synthetic VSP common source point gather.

After the data traces are recorded on electronic media, the data are processed to obtain information about the earth. FIG. 6 shows a common source point gather from a synthetic offset VSP dataset. Important components of the wavefield in offset VSP data are shown in this synthetic offset VSP gather. The first arrivals are the first energy that arrives at the receiver directly from the source. The time of the first arrival is a key element of the method described herein. The other important component is the reflections that are recorded at geophones in the borehole. The reflections are propagated to the surface of the earth via upward continuation or application of Huygens' principle and known travel times from the surface of the earth to receivers in the subsurface.

Figure 7:
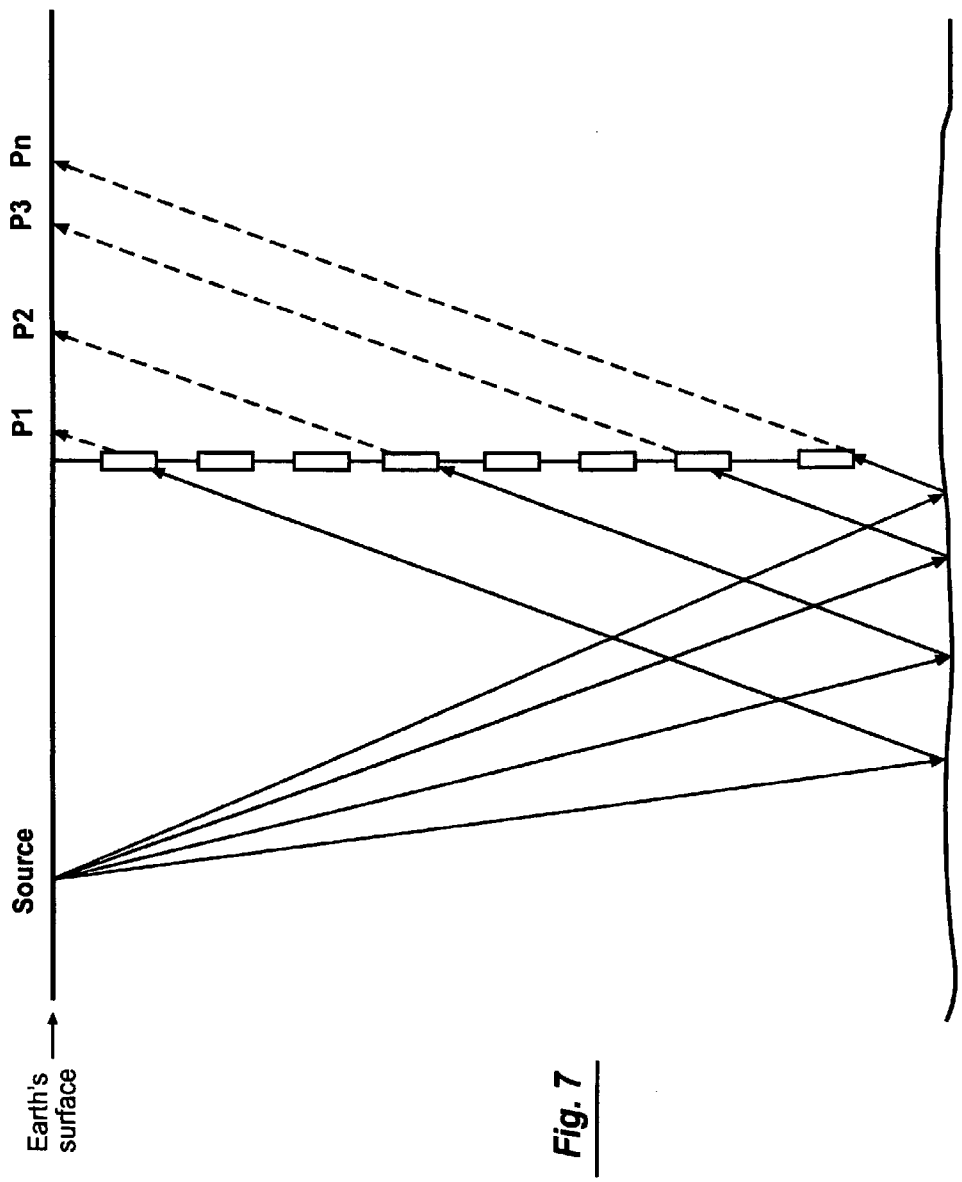
FIG. 7 is a cross-sectional diagram similar to FIG. 5 showing upward continuation of the wavefield to the surface of the earth.

A key step in the present process is to continue the VSP wavefield upward to the surface of the earth in order to represent the data as it would have been recorded at the surface of the earth rather than in the borehole. FIG. 7 depicts upward continuation of the wavefield to the surface of the earth. The dataset recorded in the borehole is thus transformed into a dataset that mimics the case in which the data had been recorded at the surface of the earth. The dashed arrows depict the wavefield being continued to the surface of the earth. After transformation of the data into surface seismic data, the data can be processed using surface seismic processing methods, including common mid-point sorting and the NMO equation. FIG. 7 shows pseudo-receivers $P_1$ through $P_n$ at the surface of the earth. The term "pseudo-receiver" is used herein to indicate the location of a seismometer to which data was propagated from a real receiver position in a borehole.

Figure 8:
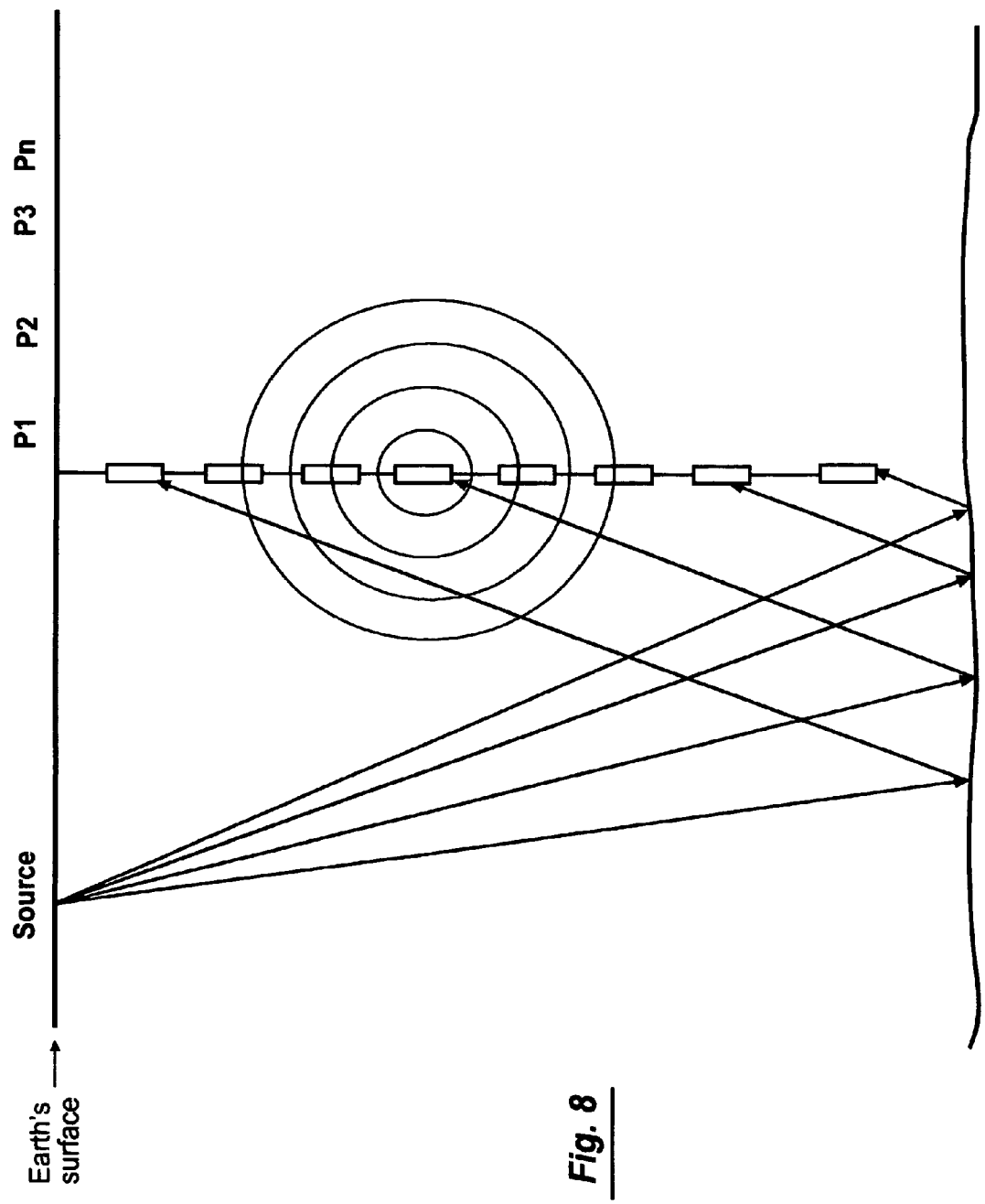
FIG. 8 is a cross-sectional diagram similar to FIG. 7 showing upward continuation of the wavefield to the surface of the earth by way of finite difference methods.

Upward continuation of the wavefield by Huygens' principle can also be modeled via finite difference or finite element methods as shown in FIG. 8. Finite difference propagation essentially propagates each amplitude recorded at each receiver through a velocity field to pseudo-receivers at the surface of earth. The data can then be processed as surface seismic data. Finite difference propagation of the wavefield is currently prohibitively expensive for common practice, though it does work and should be considered to be one possible embodiment of the present invention.

To use the finite difference method the data processor must provide a velocity model of the earth through which to propagate the seismic amplitudes. The extent to which the upward continued data can be used for successfully obtaining an image is related to the accuracy of the velocity model. While finite difference methods can be used for upward continuation of the wavefield, the following alternative method is preferred for the following reasons: (1) the alternative method does not require the provision of a velocity model, but incorporates all anisotropic and statics factors in the upward continuation; and (2) the alternative method requires many orders of magnitude less computer time to compute the upward continued seismic data than finite difference or finite element methods.

Figure 9:
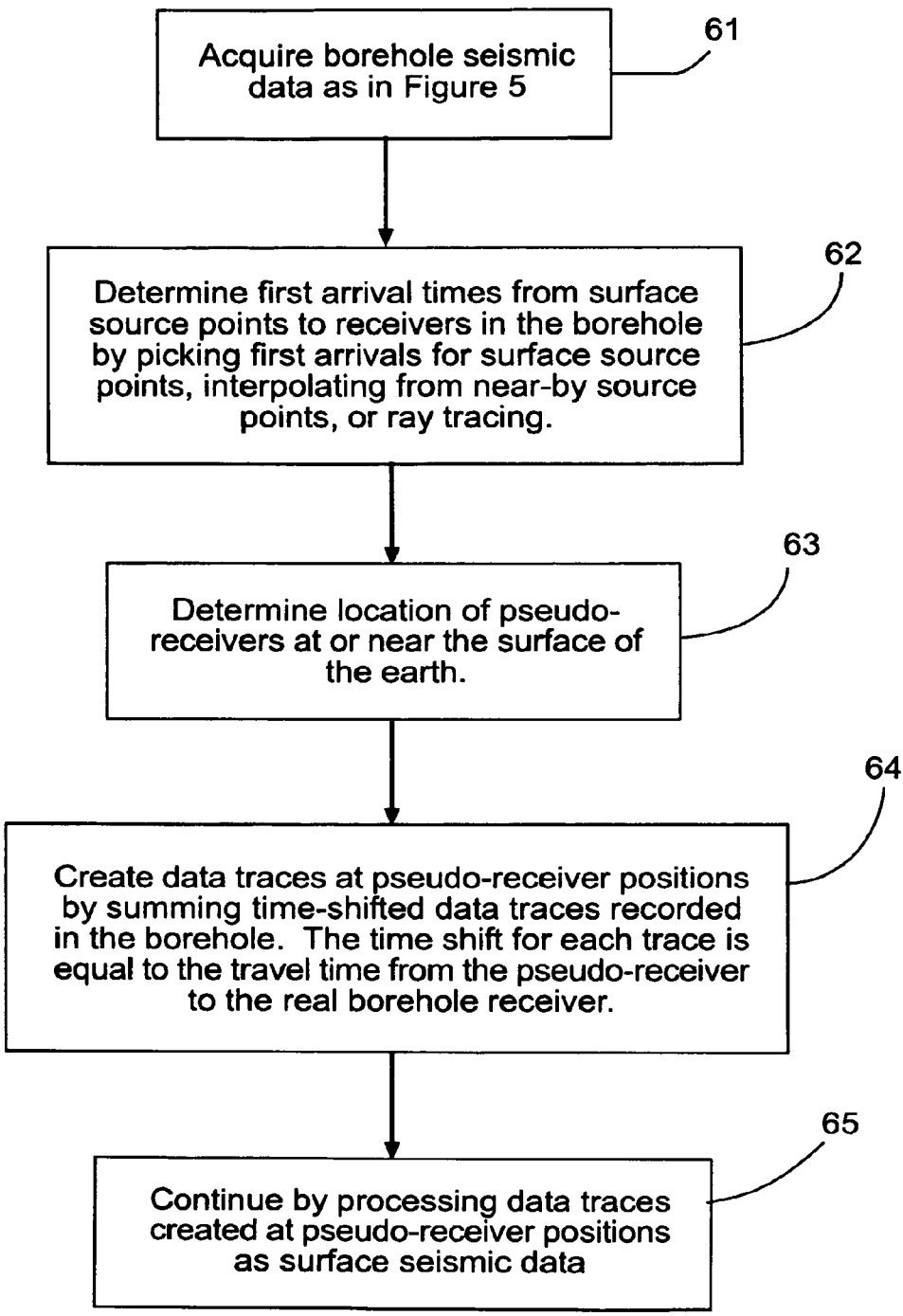
FIG. 9 is a flow chart of the process for upward continuing borehole seismic data by measured, interpolated or computed travel time delays.
Figure 10:
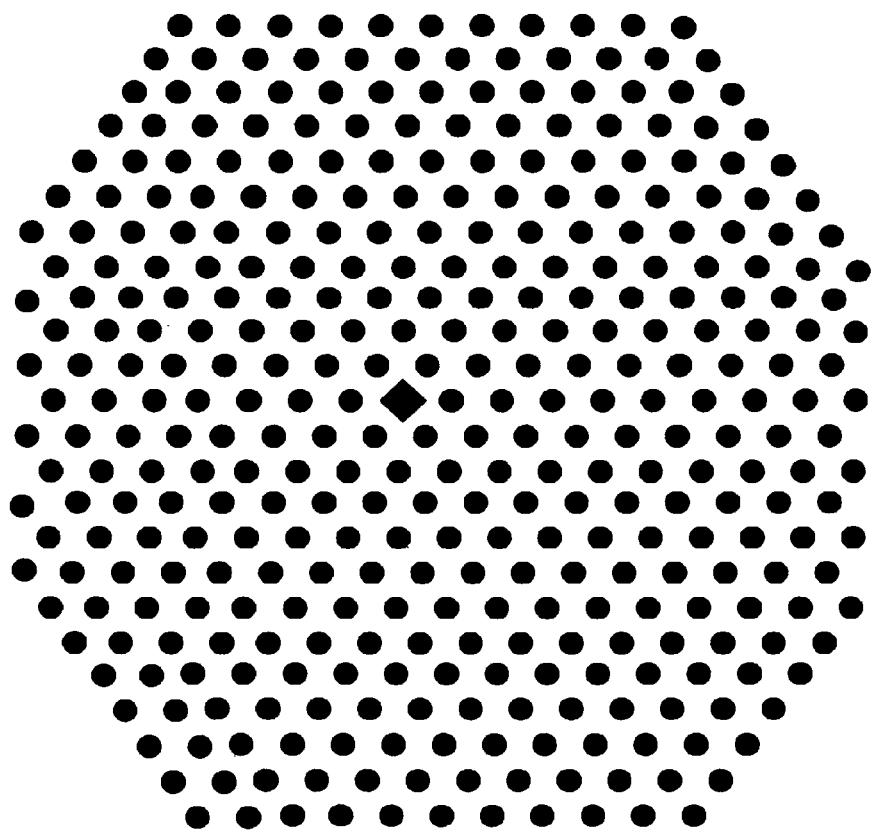
FIG. 10 is a surface map showing seismic source point locations for 3D VSP as circles. The well location is depicted as a diamond.

FIG. 9 is a flow diagram of the alternative, preferred process for upward continuing borehole seismic data by measured, interpolated, or computed travel time delays. This method of upward continuing the data to the surface of the earth begins with picking the first arrival times for source points in the survey. FIG. 10 shows a 3D VSP source point map for a hypothetical 3D VSP survey. Seismic source locations at the surface of the earth are depicted as filled circles. The well location at the surface of the earth is shown as a diamond near the center of the source points.

Borehole seismic data is initially acquired as previously described (step 61 in FIG. 9) and shown for example in FIG. 5. The travel time from each source point location to every receiver in the borehole can be determined from the first arrival times on the shot records (step 62 in FIG. 9). The travel time from a point that is not on a real source point can be estimated by interpolating travel times based on nearby source points. Such a dataset would constitute a 3D VSP. The first arrival times are picked for as many source points as is required to accurately interpolate the first arrival time for any point at the surface of the earth within the survey area where source points are present. In normal surveys, all first arrivals are picked for each source point. The first arrival time information is stored. The first arrival information for each source-receiver pair must be stored in such a way that the source coordinates (X, Y, and Elevation) can be associated with the first arrival time and the specific receiver of the source-receiver pair. For example the data can be stored in columns as follows.

| SRC_X | SRC_Y | SRC_EL | RNUM | FB_PICK |
|---|---|---|---|---|
| 100. | 200. | 344. | 1 | 221.4 |
| 100. | 200. | 344. | 2 | 225.6 |
| 100. | 200. | 344. | 3 | 229.9 |
| 200. | 350. | 317. | 1 | 188.0 |
| 200. | 350. | 317. | 2 | 194.1 |
| 200. | 350. | 317. | 3 | 199.4 |

Where SRC_X is the source point X-coordinate, SRC_Y is the source point Y-coordinate, SRC_EL is the source point elevation. RNUM is the receiver number or some number that uniquely identifies each receiver in the borehole, and FB_PICK is the first break pick time. In this example FB_PICK would be stored in milliseconds.

Figure 11:
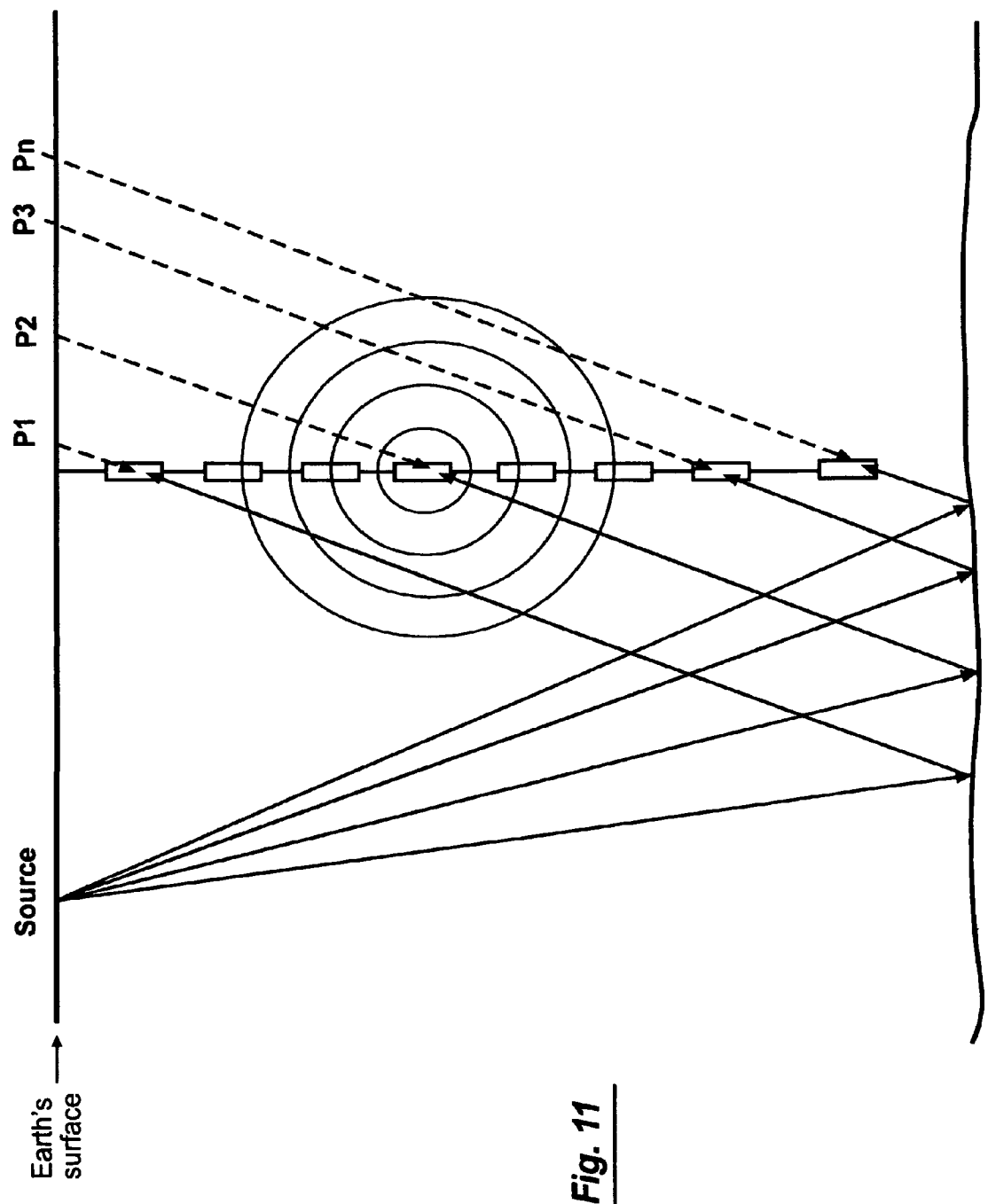
FIG. 11 is a cross-sectional diagram similar to FIG. 5 showing wavefield continuation via Huygens' principle using known or computed travel times.

The next step in the preferred method of upward continuation is to actually upward continue the data to the surface of the earth using Huygens' principle. As was discussed above, Huygens' principle states that a wavefront at one time and place is the summation of a set of virtual source points when the wavefront was at another location at another time. Berryhill, "Wave-Equation Datuming", Geophysics, vol. 44, no. 8, pp. 1329-1344 (1979) noted that continuation of a wavefield from one location to another through time could be achieved if travel times between the wavefront and the point to which the wave was being continued could be obtained. Berryhill's function for continuation is:

$$S(t)=\Sigma Wi(t-Ti)*f(t) \quad \text{(Equation 1)}$$

Where S(t) is the seismogram as a function of time, t, at the location to which the wavefield was propagated, Wi is the seismogram at the $i^{th}$ location from which the wavefield was propagated, Ti is the seismic travel time for a wave between the position S and the position Wi, and f(t) is a filter that, while recommended by Berryhill, is optional. FIG. 11 is a cross-sectional diagram illustrating wavefield continuation via Huygens' principle using known or computed travel times. The wavefield can be continued to pseudo-receivers at the surface of the earth in a much faster way than finite difference upward continuation. Berryhill discusses a method of fast wavefield continuation by application of Huygens' principle if the seismic travel time between a real receiver and a pseudo-receiver are known. In the case of 3D VSP data or offset VSP data, the travel times from the surface of the earth to the receivers in the borehole are either known from direct first break pick times (as depicted by the dashed lines) or can be computed if the observed travel times are not known. Thus the wavefield as it would have been recorded at the pseudo-receivers can be quickly and accurately approximated by summing wavefield amplitudes recorded in the borehole after application of the time delay observed on first breaks, as previously described with regard to Equation 1. We refer to the upward continued data as a "Huygens Stack".

Figure 12:
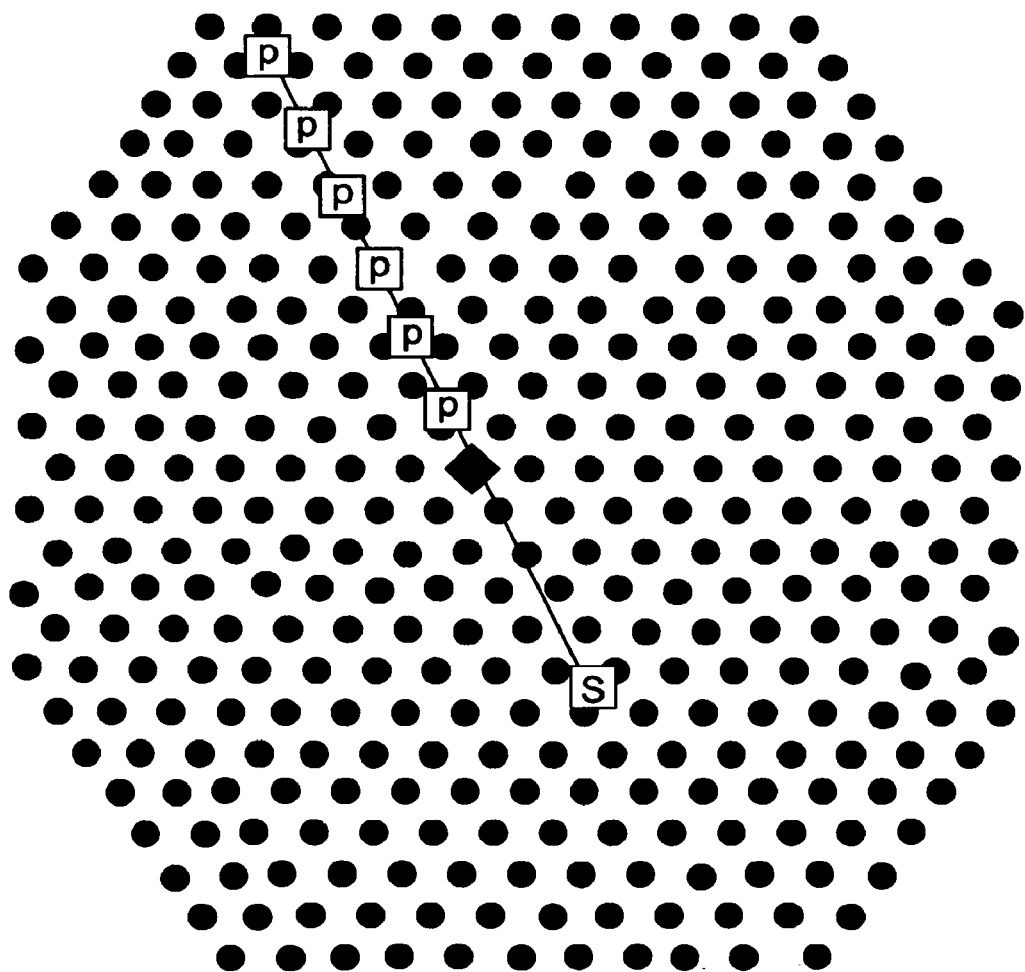
FIG. 12 is a surface map showing pseudo-receiver positions, p, for a source point, S.

In particular, the present method creates pseudo-receiver positions at the surface of the earth for each of the source points (step 63 in FIG. 9). For example, FIG. 12 shows the map view of a line of pseudo-receiver positions, p, that extend from the receiver well in a direction that is co-linear with the source, S, and the top of the well location. The travel times from each position, p, to the receivers in the receiver well can be interpolated from first arrival travel times measured for source points (filled circles) that are nearby the position of each point, p. The synthetic seismogram at each location, p, is computed by Equation 1 where the time delay, Ti, which is the only unknown on the right hand side of Equation 1, is either known from measured first arrivals at each receiver location in the borehole, or can be accurately interpolated from the first arrival picks from source points that surround the pseudo-receiver position (step 64 in FIG. 9). The resulting synthetic seismograms can then be processed using conventional techniques as if they were actual surface seismic data (step 65 in FIG. 9).

The seismograms created for the pseudo-receivers at the surface of the earth have the following attributes:
 a) They can be used as seismograms that were recorded at the surface of the earth and thus standard surface seismic data processing methods can be applied to the data.
 b) The seismograms have all static time delays that affect the travel time from the seismic source to the seismic receivers. Thus, surface-consistent data processing will yield consistent source and receiver statics.
 c) The reflection point between the source and receiver can be estimated based on the source-receiver position and the dip of beds in the same way that it is done for normal surface seismic data. This is one of the most important aspects of this technology given that estimating the reflection point for geophones in the borehole is a function of the unknown velocity field and the source and receiver position. When the receiver is near the same elevation as the source, the reflection point can initially be assumed to be half way between the source and receiver position and the unknown velocity field can be determined by standard NMO analysis.

Travel times delays that are applied as the Ti term in Equation 1 are not restricted to measured first arrival travel times. The value used in Ti can be computed from ray tracing or other travel time estimation techniques, such as picking first breaks from data produced from finite difference modeling.

Pseudo-receivers can be placed in arbitrary positions relative to the real source and receiver position if the travel time term in Equation 1 can be either measured or estimated. The geophysical relevance of pseudo-receiver placement is dependent on the dataset and the geophysical method that is being applied. The geophysical relevance of the receiver position is related to the direction of propagating waves that are recorded in the borehole. Multi-component geophones that are typically used in modern VSP recording can be used to determine the direction of wavefield propagation and then be applied to determining the optimal placement of pseudo-receivers.

Figure 13:
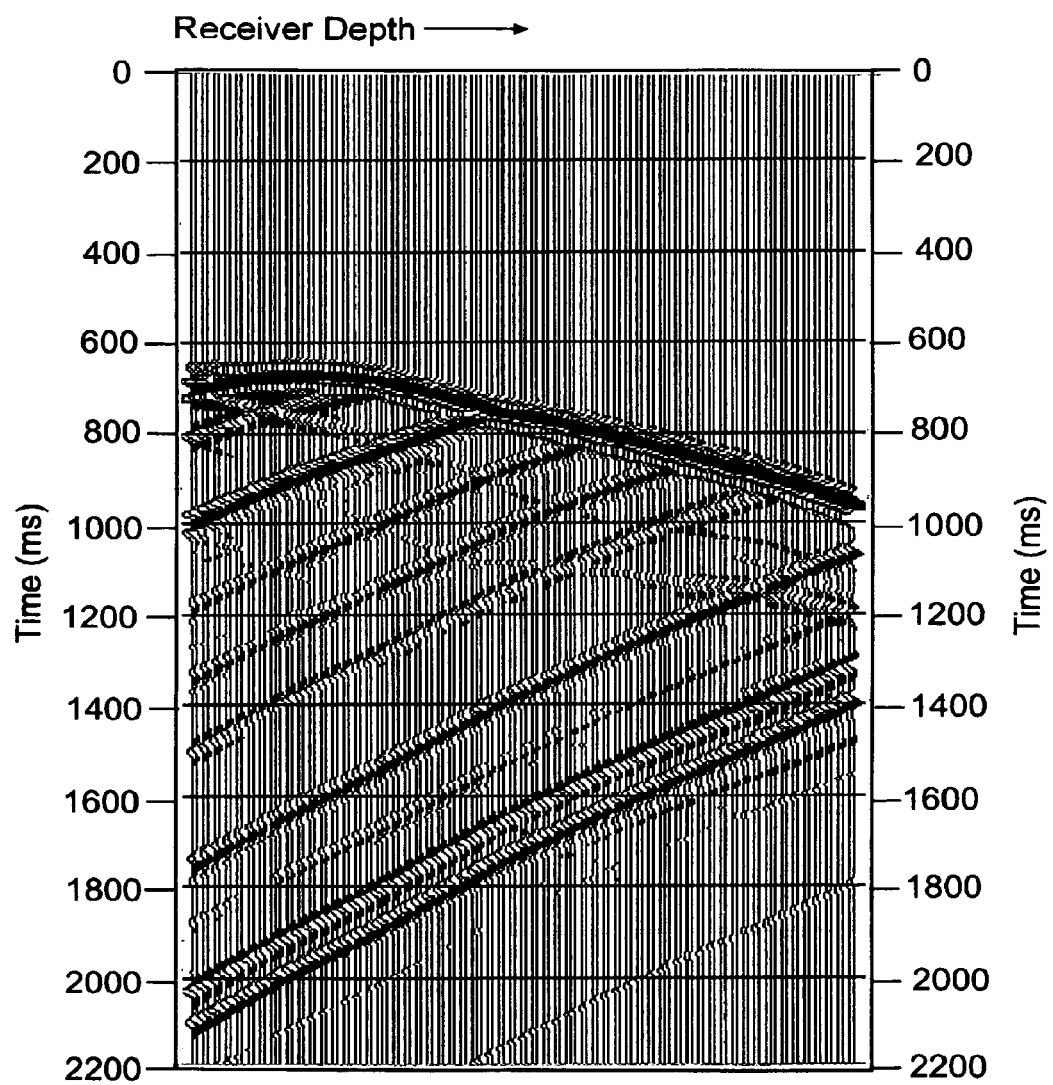
FIG. 13 is a graph of a synthetic common source gather generated by finite difference methods.
Figure 14:
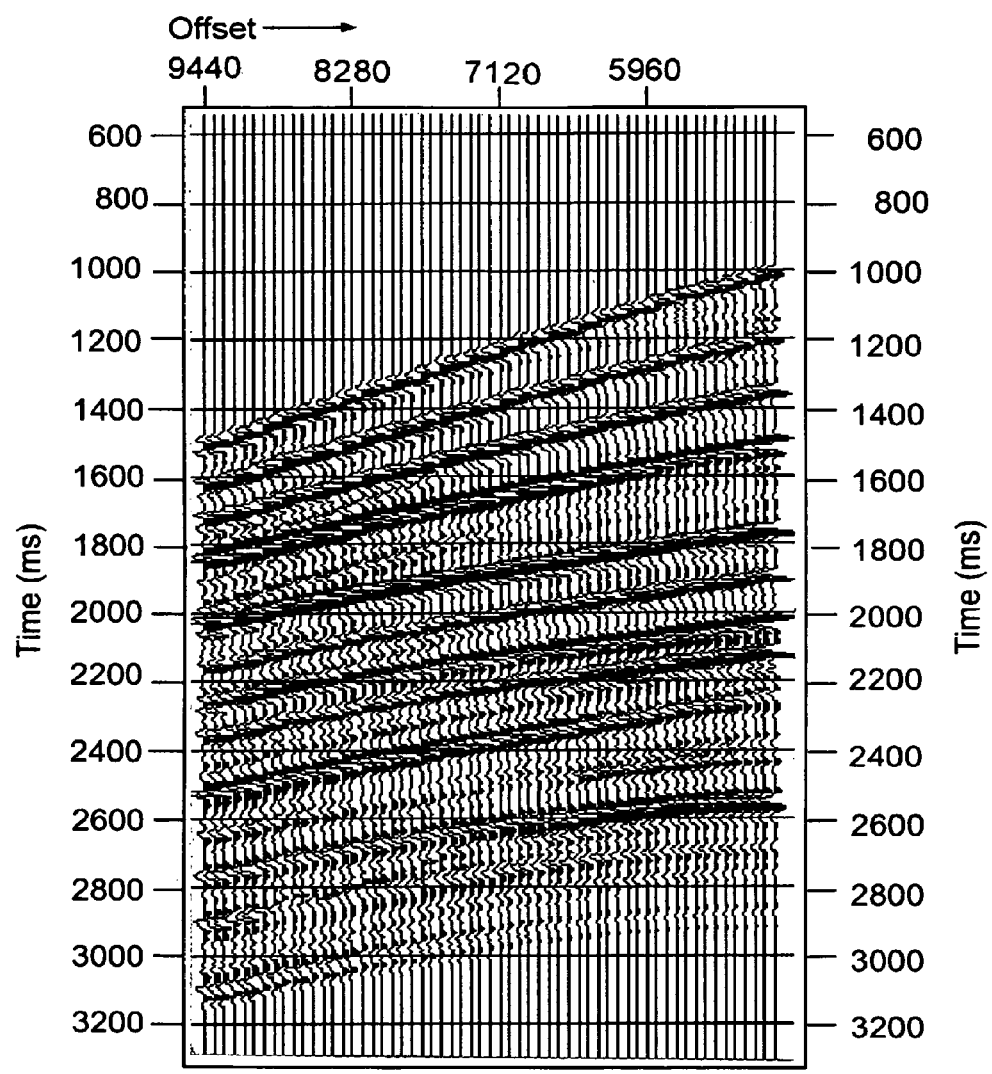
FIG. 14 is a graph of an upward continued common source gather done using Huygens' principle and Equation 1.
Figure 15:
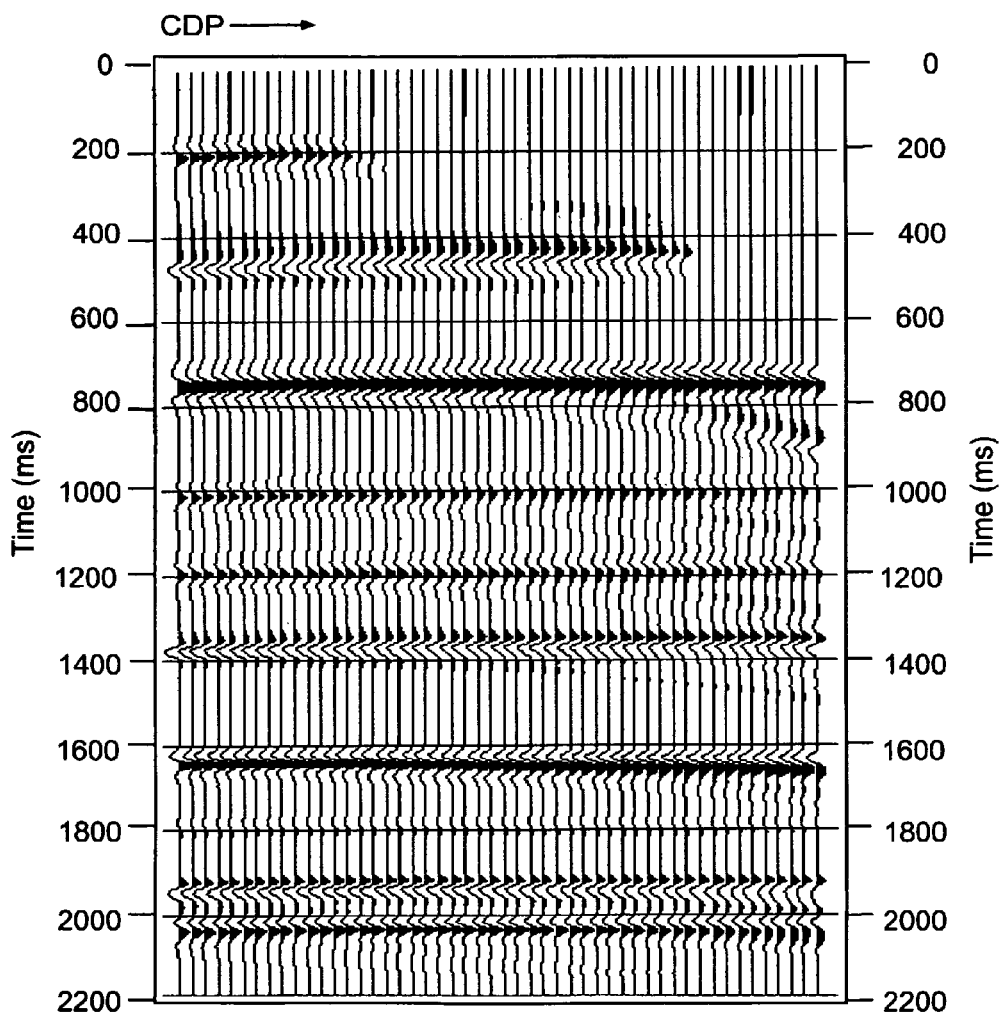
FIG. 15 is a graph of the CDP stack created by processing upward continued data as surface seismic data.

Example of Upward Continuation by Travel Times. FIG. 13 shows a synthetic common source gather generated by the finite difference software to demonstrate the present method. The gather in FIG. 13 is one of a set of eleven finite difference shot records with varying horizontal source-receiver offsets that were computed to demonstrate the methods described. The upward continued version of this shot is shown in FIG. 14. Upward continuation was done by using Huygens' principle and Equation 1 described above. Source and receiver coordinates were assigned to the data traces for all upward continued common source gathers. Common depth point numbers were assigned to the traces of the twelve upward continued shots (not shown) via the standard method in surface seismic data processing. The data were sorted by CDP gather and normal moveout velocities were picked and applied to the dataset. The two-way time image (see FIG. 15) was then created by stacking the moveout-corrected CDPs. Travel times to the receivers were symmetric on either side of the well because the velocity model was one-dimensional and the receiver well was vertical.

Method Using Finite Difference Upward Continuation. For the reasons mentioned above, upward continuation via finite difference is inferior to upward continuation by the summing method in Equation 1. Finite difference upward continuation methods for VSP processing have been reduced to practice as a result of our work. In spite of its inferiority, this invention should be understood to include the finite difference technique as a way of upward continuation of VSP data to the surface of the earth or to an elevation near the source elevation for the purpose of seismic reflection imaging of borehole seismic data.

Figure 16:
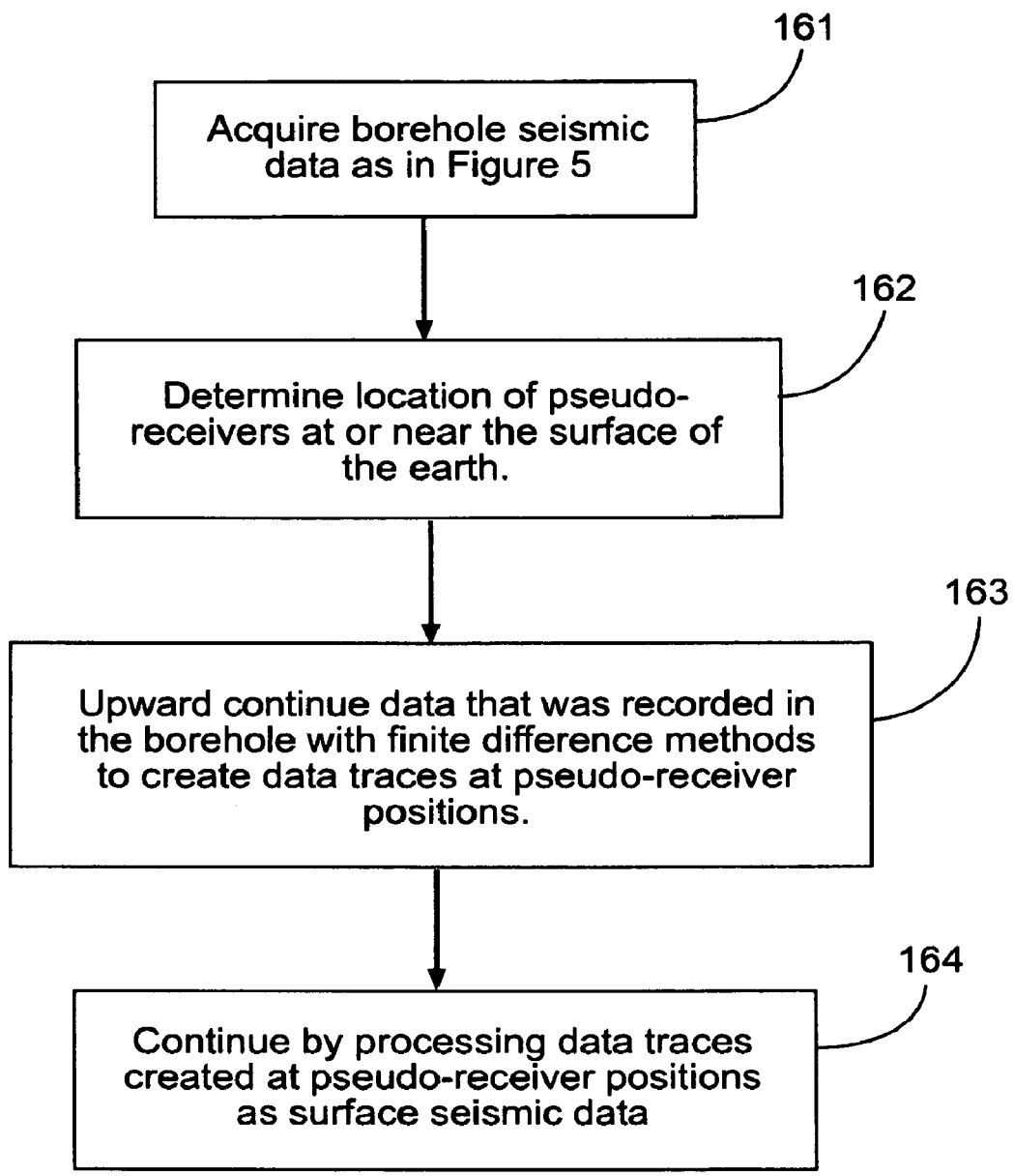
FIG. 16 is a flow diagram of the process of upward continuing borehole seismic data by finite difference methods.

FIG. 16 is a diagram of the processes using finite difference upward continuation rather than the preferred method of upward continuation via first arrival times. Borehole seismic data is initially acquired as previously described (step 161 in FIG. 16). A set of pseudo-receiver positions are determined at the surface of the earth for each of the source points (step 162 in FIG. 16). As in the Huygens Stack method described above, the VSP common source gathers are filtered so as to extract the upward traveling seismic waves for upward continuation. The wavefield was then propagated through a velocity model to pseudo-receivers at an elevation that was equal to the seismic data processing datum elevation that was selected for processing (step 163 in FIG. 16). The elevation selected was the mean source elevation for the survey though any elevation can be selected and this invention should not be restricted to using the mean source elevation. As in the use of the stack method of Equation 1, the receiver coordinates were assigned to the pseudo-receivers at the surface of the earth and the data traces were input to a surface seismic data processing flow.

Figure 17:
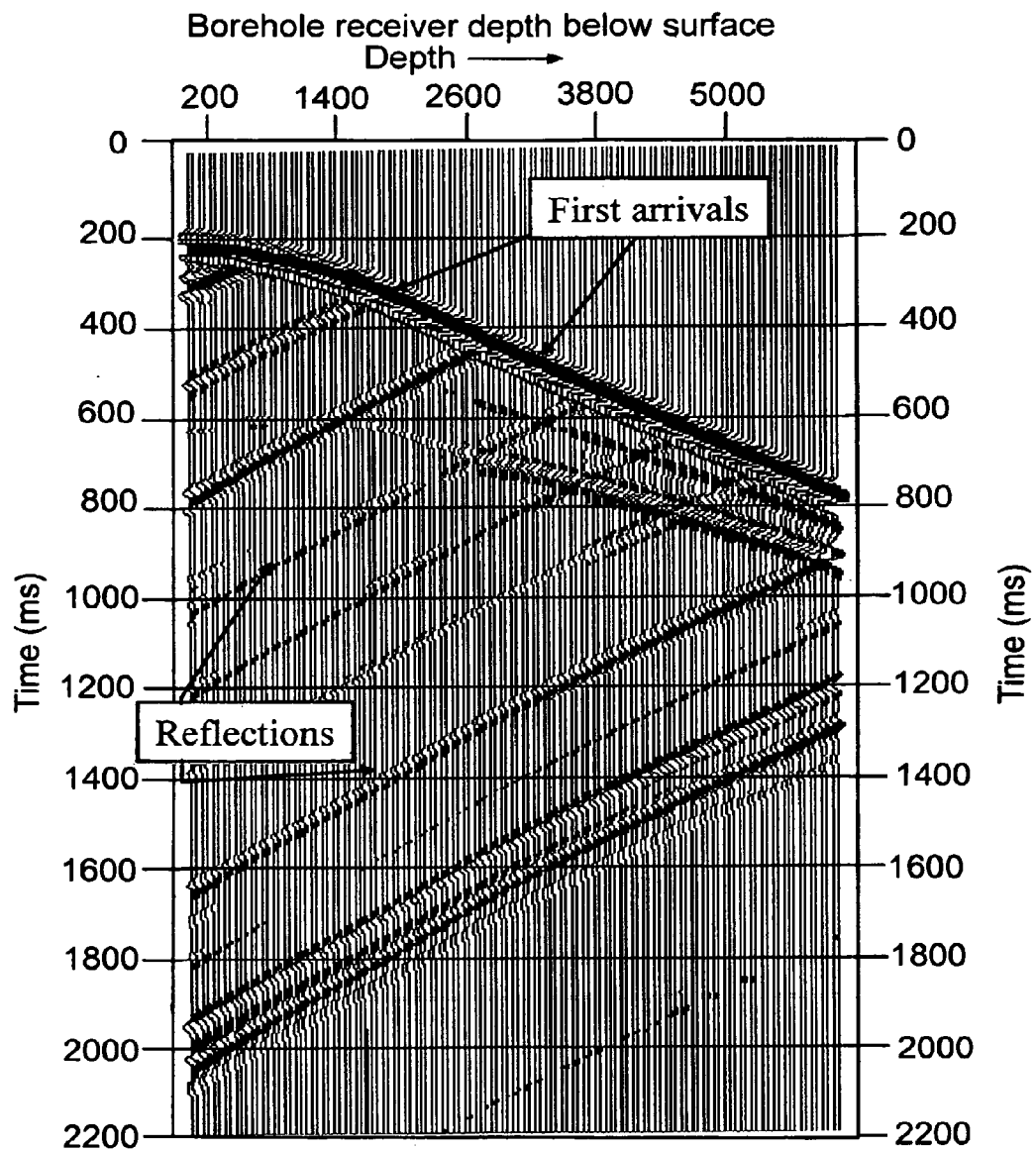
FIG. 17 is a graph of a synthetic VSP common source point gather generated by finite difference methods.
Figure 18:
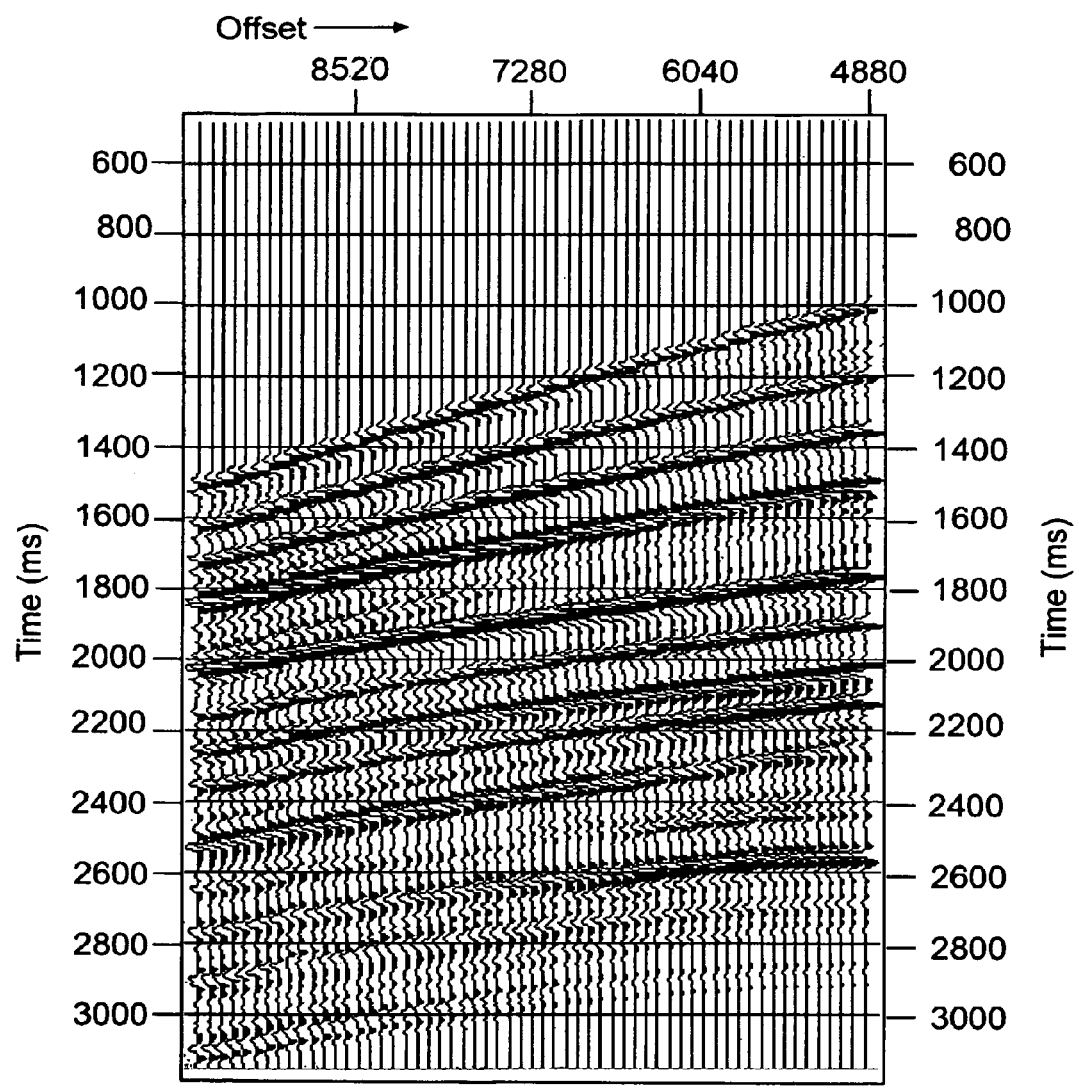
FIG. 18 is a graph of the upward continued common source gather shown in FIG. 17 after upward continuation by finite difference methods.
Figure 19:
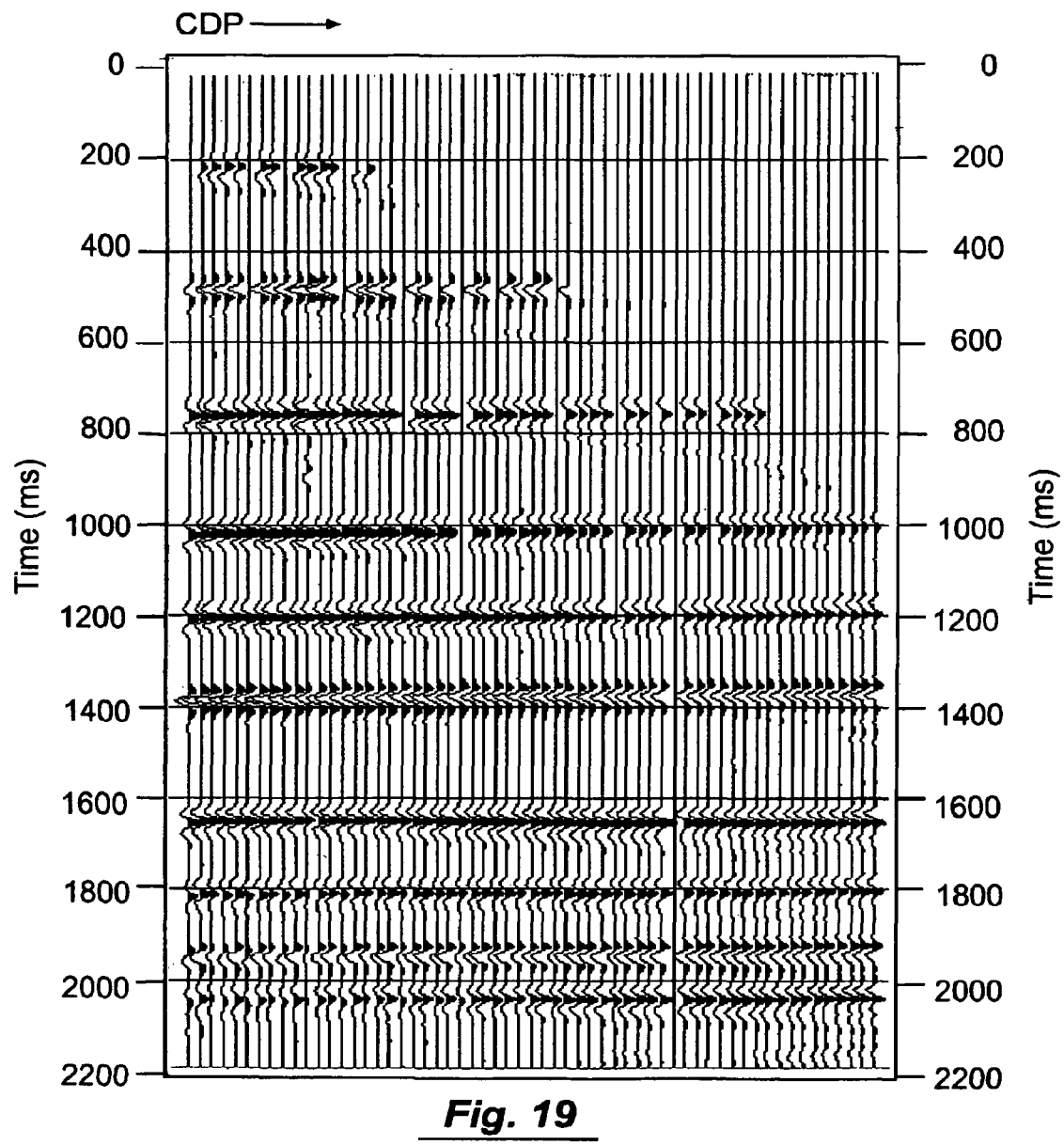
FIG. 19 is a graph of the CDP stack created by processing upward continued data as surface seismic data. The data were upward continued by finite difference methods.

FIG. 17 shows a finite difference common source gather. FIG. 18 is the shot record after upward continuation to the elevation of the source by finite difference methods. The trace with the smallest horizontal offset from the source point is shown on the right. Increasing horizontal source-receiver offset is to the left. FIG. 19 is the image produced after processing the synthetic VSP data after upward continuation with finite difference methods. As before, resulting synthetic seismograms can be processed using conventional techniques as if they were actual surface seismic data (step 164 in FIG. 16).

General Application of Wave Equation Approximations. Upward continuation of VSP data by the Huygens Stack method or finite difference methods are all approximations of the general wave equation. All of these methods can be used to predict a wavefield at the surface of the earth based on seismic data that has been recorded in a borehole, which can then be treated as surface seismic data. It is possible that other approximations of the general wave equation could be employed for this purpose. The present invention should be construed to include other approximations of the general wave equations used to predict the wavefield at the surface of the earth, so that the wavefield can be treated as surface seismic data for purposes of subsequent seismic data processing.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

What is claimed is:

1. A method for processing seismic data on electronic media recorded from a receiver in a borehole from a first seismic source near the surface of the earth, the method comprising: selecting a location for a pseudo-receiver adjacent to a second seismic source; determining a time delay for each of a plurality of receivers in the borehole, each time delay substantially equal to a first-arrival time between the second seismic source and each of the plurality of receivers; applying each determined time delay to seismic data associated with each of the plurality of receivers in the borehole to obtain time shifted seismic data; and summing the time shifted seismic data to obtain pseudo-receiver associated seismic data on an electronic medium.

2. The method of claim 1 wherein the first seismic source is part of a 3D shot record recorded with multi-component geophones.

3. The method of claim 1 wherein determining the time delay for each of a plurality of receivers in the borehole further comprises: interpolating measured first-arrival times associated with a plurality of seismic sources adjacent to the pseudo-receiver.

4. The method of claim 1 wherein determining a time delay to apply to the seismic data recorded in the borehole further comprises interpolation from first arrival times at the receiver from a plurality of seismic sources adjacent to the pseudo-receiver.

5. The method of claim 1 further comprising processing the obtained pseudo-receiver associated seismic data as surface seismic data.

6. The method of claim 1 wherein a ray-trace travel time from the receiver to the pseudo-receiver is calculated by ray tracing.

7. A method for processing seismic data on electronic media recorded from a plurality of receivers in a borehole from a first seismic source near the surface of the earth comprising: selecting a location for a pseudo-receiver adjacent to a second seismic source near the surface of the earth, wherein the second seismic source is part of a 3D shot record; determining a pseudo-receiver associated time delay for each of the plurality of receivers in the borehole, each time delay determined from measured first-arrival times associated with the second seismic source adjacent to the pseudo-receiver; applying each determined pseudo-receiver associated time delay to the seismic data to obtain time shifted seismic data; and summing the time shifted seismic data to obtain pseudo-receiver associated seismic data on an electronic medium.

8. The method of claim 7 wherein determining the pseudo-receiver associated time delay further comprises: interpolation of measured first arrival times at the receiver from a plurality of seismic sources adjacent to the pseudo-receiver.

9. The method of claim 7 further comprising processing the obtained pseudo-receiver associated seismic data as surface seismic data.

10. The method of claim 7 wherein the travel time from the plurality of receivers to the pseudo-receiver is calculated by ray tracing.

11. The method of claim 7 wherein the borehole receivers are multi-component geophones.

12. A method for processing borehole seismic data on electronic media, the method comprising: acquiring data for a borehole seismic receiver from a first seismic source to obtain a borehole-receiver-trace; selecting a position adjacent to a second seismic source for a pseudo-receiver near the surface of the earth wherein the second seismic source is part of a 3D shot record; measuring a seismic travel time from the second seismic source associated with the pseudo-receiver to the borehole seismic receiver to obtain a measured travel time value; and upward-continuing the borehole-receiver-trace from the borehole seismic receiver to the pseudo-receiver based on using the measured travel time value to obtain pseudo-receiver borehole-receiver-trace data on an electronic medium.

13. The method of claim 12 further comprising summing a plurality of pseudo-receiver borehole-receiver-traces.

14. The method of claim 12 further comprising summing a plurality of pseudo-receiver borehole-receiver-traces associated with the pseudo-receiver position.

15. The method of claim 12 further comprising gathering a plurality of pseudo-receiver borehole-receiver-traces associated with the pseudo-receiver position to obtain a gather of pseudo-receiver borehole-receiver-traces.

16. The method of claim 12 wherein upward-continuing the borehole-receiver-trace data further comprises using one of: i) a finite difference method, ii) Huygen's Principle and iii) ray-tracing.

17. The method of claim 12 wherein obtaining the measured travel time value for the borehole-receiver-trace further comprises: interpolating first arrival times between a plurality of seismic sources and the borehole seismic receiver, wherein the plurality of seismic sources are located adjacent to the pseudo-receiver position.

18. The method of claim 12 further comprising determining first arrivals from source points to the borehole seismic receiver by picking one of: i) near-by source points, ii) ray-tracing and iii) interpolated near-by source points.

19. The method of claim 12 further comprising processing pseudo-receiver borehole-receiver-trace data as surface seismic data.

* * * * *